Sept. 25, 1934.  G. R. HILLSTROM  1,974,988
COFFEE CANNISTER
Filed May 21, 1932  2 Sheets-Sheet 1

INVENTOR
G. R. HILLSTROM.
Milburn & Milburn
ATTORNEYS

Sept. 25, 1934. G. R. HILLSTROM 1,974,988
COFFEE CANNISTER
Filed May 21, 1932 2 Sheets-Sheet 2

INVENTOR
G. R. HILLSTROM.
Milburn and Milburn
ATTORNEYS

Patented Sept. 25, 1934

1,974,988

UNITED STATES PATENT OFFICE 1,974,988

COFFEE CANNISTER

Gustaf R. Hillstrom, Shaker Heights, Ohio

Application May 21, 1932, Serial No. 612,824

8 Claims. (Cl. 221—104)

This invention relates to a culinary dispensing device which is adapted to discharge a predetermined quantity of ground coffee or other granular or pulverized materials, or the like.

Experience has shown that the conventional practice of making coffee by merely guessing at the quantity of ground coffee to be used at any given time, means not only a waste of coffee but failure to obtain the best possible flavor.

There have already been numerous attempts to devise a cannister for the purpose of measuring a predetermined quantity of ground coffee or other like material from the cannister but such devices are of a comparatively complicated nature and are not especially adapted for manufacture and sale at a popular price.

Therefore, one object of the present invention is to devise an efficient form of cannister with a measuring attachment which can be constructed in such manner as to present an attractive appearance calculated to appeal to the purchasing public and also capable of selling at a comparatively low price.

Certain features of novelty of the present construction relate to the particular form of measuring container at the lower end of the cannister and the means for mounting and operating the same; also, the particular form of agitator which is arranged within the cannister so as to prevent clogging of the ground coffee and the particular co-operative relation of this element with the measuring container.

Other objects will appear from the following description and claims when considered together with the accompanying drawings.

Figure 1:
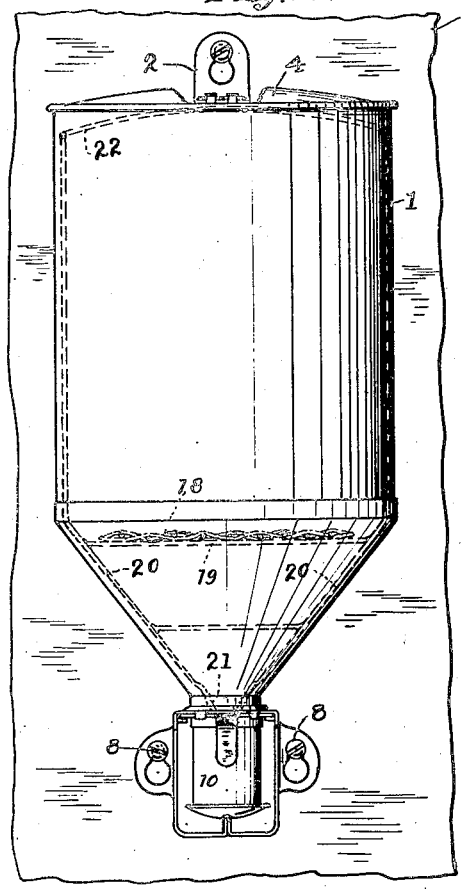
Fig. 1 illustrates my improved form of device in front elevation.

It is to be understood that the present form of disclosure is merely for purposes of illustration and that various modifications may be made without departing from the spirit of the present invention as herein set forth and claimed.

According to the present form of invention, the cannister 1 is attached in any suitable manner, as indicated by reference numeral 2, to the wall or other form of support 3, so that the cannister 1 is supported in upright position. The cannister has the hinged closure 4 which is provided upon the under edge portion thereof with means for hermetically sealing the same when in closed position. Also, the closure 4 is provided with snap-engaging means 5 cooperating with a bead 6 about the upper edge of the cannister so as to maintain the closure in closed position.

The lower part of the cannister has a tapering form, as indicated by reference numeral 7, and has a bottom opening for discharge of the ground coffee or other pulverized or granular form of material therefrom. Secured to the bottom end of the cannister is the slide-way which has an opening through the top thereof in registry with the discharge opening of the cannister. This slide-way is attached at its rear end to the wall 3, at the points indicated by reference numeral 8. This slide-way is formed of a single piece of comparatively light sheet metal which is bent into substantially rectangular form with the top part thereof completely closed except for the opening which registers with the discharge opening of the cannister. The opening in the upper side of the slide-way is provided with a neck portion which fits within a corresponding neck portion at the lower end of the cannister. The end edges of the sheet metal, from which the slide-way is formed, are bent up along the middle line of the bottom so as to form an upwardly extending double flange or rib 9. These upwardly extending edge portions 9 are maintained together as a single rib by means of the securing means 8 upon the two sides of the slide-way, which maintain the same in permanently fixed position and without other securing means. Also, the rib 9 serves as a reinforcing means.

The slide member which has slidable engagement within the slide-way comprises the measuring container 10 which has an open top fitting within a corresponding flanged opening in the slide member, while there is provided also the rearwardly extending imperforate portion 11 which has its edges arranged in slidable engagement with the ears 15 which are struck out as integral parts of the sides of the slide-way and bent inwardly parallel to the top thereof. The container 10 has the bottom closure 12 hinged at 13 at the rear edge of the opening and this closure is provided with a slide groove 14 extending diametrically across the lower side thereof, this groove being adapted for sliding engagement along the rib 9 for a purpose to be explained.

Figure 2:
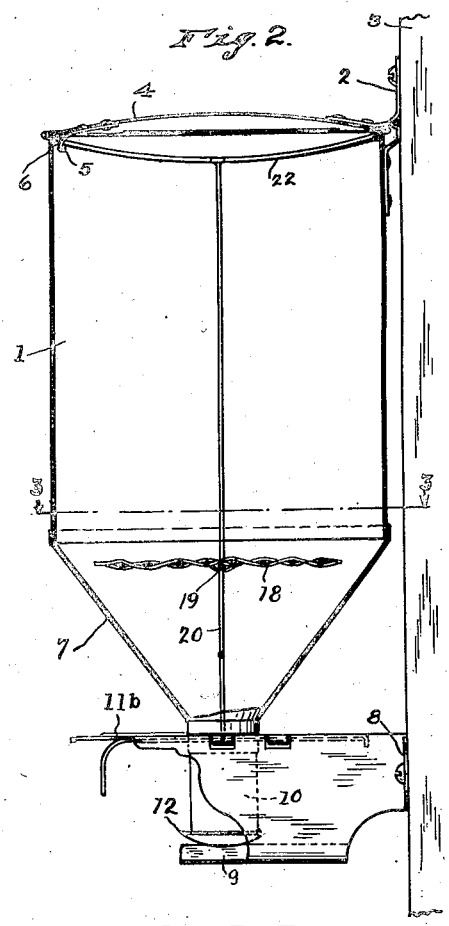
Fig. 2 is a view of the same with the upper part in vertical section while the lower part is in side elevation.
Figure 3:
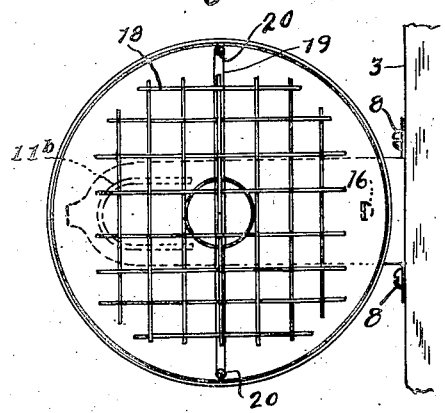
Fig. 3 is a view taken on line 3—3 of Fig. 2.
Figure 4:
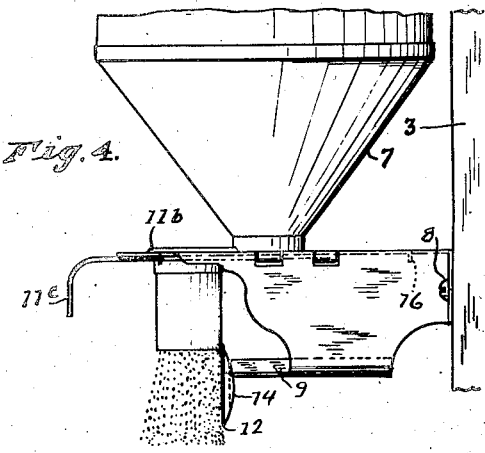
Fig. 4 is a view corresponding to the lower part of Fig. 2 but with the measuring container in withdrawn or discharging position.
Figure 5:
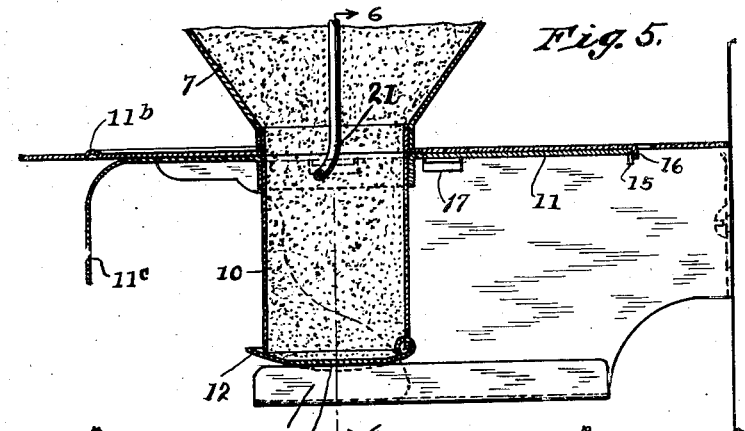
Fig. 5 is a sectional view corresponding to the lower part of Fig. 2 so as to illustrate the interior construction.
Figure 6:
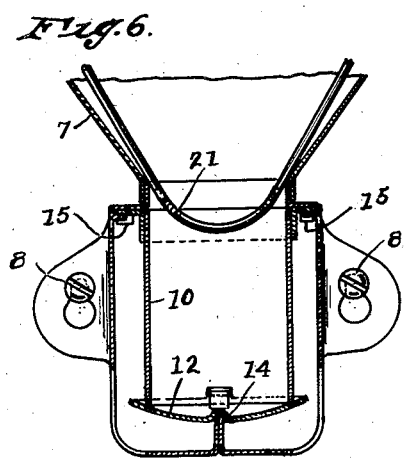
Fig. 6 is a view taken on line 6—6 of Fig. 5.
Figure 8:
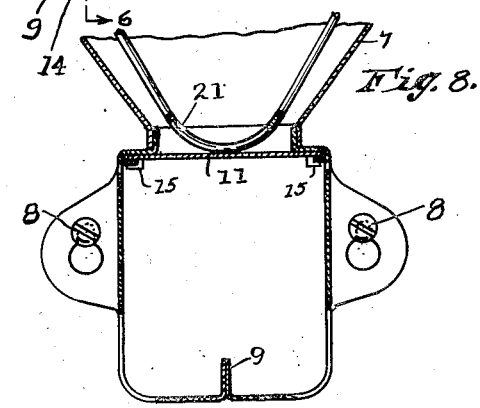
Fig. 8 is a view taken on line 8—8 of Fig. 7.
Figure 7:
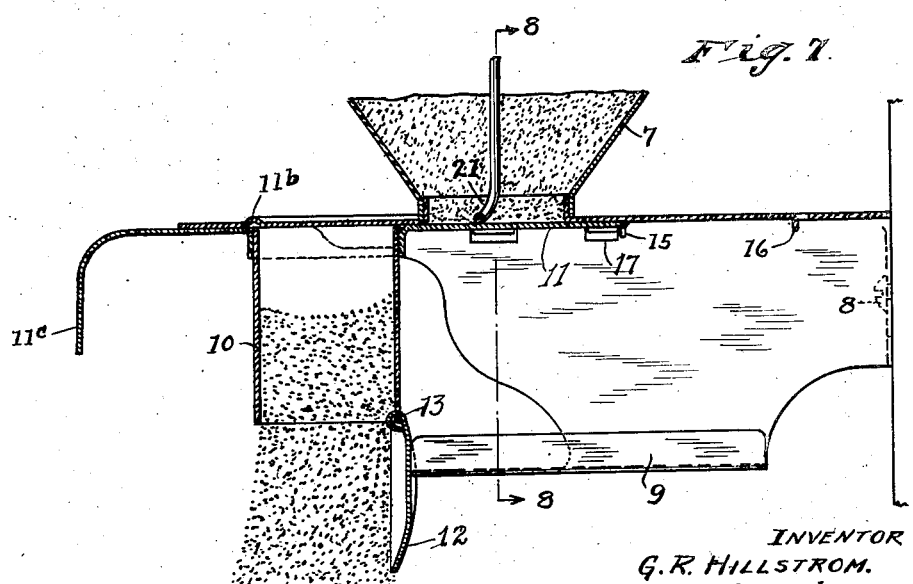
Fig. 7 is a view similar to Fig. 5 except that the measuring container is shown in withdrawn or discharging position.

These parts are so constructed and arranged that when in the position indicated in Figs. 2 and 5, the closure 12 will be maintained in closed position by virtue of its engagement with the rib 9. When the container 10 occupies such position, its upper open end is in registry with the lower open end of the cannister so as to permit filling of the measuring container. If so desired, a sealing engagement may be provided between the closure 12 and the edge of the container 10 so as to render the same air-tight, my particular form of closure and operating means being well adapted for such refinement. When, however, the slide member with the measuring container occupies the position indicated in Figs. 4 and 7, the measuring container is sufficiently beyond the end of the rib 9 to permit the closure 12 to swing open by gravity and thus permit the contents of the container to be discharged freely. At this time, the rear imperforate portion 11 of the slide member extends across the discharge opening of the cannister so as to prevent discharge of its contents until the measuring container 10 has been returned to position immediately therebeneath.

As a means of limiting both the forward and rearward sliding movements of the slide member, I have provided the depending flange 15 on the rear end of the portion 11 so as to engage the depending integrally formed ear 16 in the top part of the slide-way when the slide member is in rear or withdrawn position and so as to engage either one or both of the ears 17 when the slide member is in outer or extended position. The outer end portion of the top part of the slide member is provided with an integrally formed reinforcing rib 11b which extends about the end and two sides and near the edge thereof. The slide member is provided also with a finger-engaging portion 11c for manipulation thereof.

In order to prevent the ground coffee or other granular form of material within the cannister from becoming caked, which would interfere with the free gravity feed of the contents of the cannister into the measuring container, I have provided an agitator of a particular construction and arranged for a particular manner of cooperation with other parts of the device, as will be explained. This agitator comprises a transversely extending portion of coarse wire mesh 18 which extends across the lower part of the cannister and which is secured in any suitable manner to a transversely disposed wire 19 which in turn is secured at its opposite ends to the inclined portions 20 of a bent wire. The middle portion of the bent wire has its U-shaped portion 21 adapted for registry with the lower open end of the cannister. This portion 21 of the wire is in fact adapted to extend slightly through the lower end of the cannister for cooperation with the slide member for a purpose to be explained. The upper opposite ends of the bent wire are attached to a spring wire 22 which extends about the upper part of the cannister and which is adapted to bear against the under side of the bead 6 provided about the upper edge of the cannister.

These parts are so constructed and arranged that when the slide member is in withdrawn or filling position, the lower bent portion 21 of the wire will extend into the upper open end of the measuring container. Then, when the slide member is in extended or emptying position, the rear edge of the top opening of the measuring container will engage the lower bent end portion 21 of the wire member and cause the same to move slightly laterally and upwardly, giving the same movements to the agitator member 18. When the slide member has been fully extended to discharging position, the lower end 21 of the wire member will have been raised so as to rest upon the imperforate portion 11 of the slide member. Thus, the agitator member is given a compound lateral and vertical movement.

As indicated in the drawings, the lower bent end portion 21 of the wire member is inclined forwardly so as to facilitate the engagement of the same by the rear edge of the top opening of the discharge container and permit the bent end portion to ride up upon the portion 11, as just explained. Also, it will be seen that by virtue of the resilience provided in the agitator mechanism, the lower end 21 of the bent wire member will engage the imperforate portion 11 of the slide member with sufficient force to maintain the slide member in extended position until forced into withdrawn position by manipulation of the operator. Also, the projection of the lower end 21 of the bent wire member into the top of the measuring container when the slide member is in withdrawn position will serve to prevent accidental withdrawal of the same. Thus, this mechanism, by virtue of its particular construction and arrangement, serves the two-fold function of automatically operating the agitator and also maintaining the slide member in position to which it is moved.

Thus, I have devised a comparatively simple and attractive form of cannister with a measuring discharge means, which is capable of efficient and dependable operation and which at the same time may be manufactured and sold at a comparatively low cost.

What I claim is:

1. In a device of the class described, the combination of a cannister having a discharge opening through the lower end thereof through which the contents thereof may feed by gravity, a substantially rectangular, one-piece slide-way arranged below the discharge opening of the cannister and having an opening through the top side thereof in registry therewith, a slide member having slidable engagement within said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, a gravity-opening hinged closure member upon the lower end of the measuring container, and an upwardly extending integral projection upon the bottom of the slide-way adapted for engagement by said closure so as to automatically close the same as the measuring container is moved to filling position.

2. In a device of the class described, the combination of a cannister having a discharge opening through the lower end thereof through which the contents thereof may feed by gravity, a substantially rectangular, one-piece slide-way arranged below the discharge opening of the cannister and having an opening through the top side thereof in registry therewith, a slide member having slidable engagement within said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, said one-piece slide-way being formed of sheet metal and having its end edge portions flanged upwardly along the bottom thereof so as to form a rib, a gravity-opening closure hinged upon the rear side of the lower end of the measuring container and adapted for slidable engagement with said upwardly extending rib so as to automatically close said closure as the slide member is moved back into filling position.

3. In a device of the class described, the combination of a cannister having a discharge opening through the lower end thereof through which the contents thereof may feed by gravity, a substantially rectangular, one-piece slide-away arranged below the discharge opening of the cannister and having an opening through the top side thereof in registry therewith, a slide member having slidable engagement with said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, said one-piece slide-way being formed of sheet metal and having its end edge portions flanged upwardly along the bottom thereof so as to form a rib, a gravity-opening closure hinged upon the rear side of the lower end of the measuring container and adapted for slidable engagement with said upwardly extending rib so as to automatically close said closure as the slide member is moved back into filling position, said slide-way having inwardly extending integrally formed ears for slidable engagement by said slide member, and said slide member being provided with an integral projection for engagement with an ear on said slide-way so as to constitute a means for limiting the forward slidable movement of the slide member.

4. In a device of the class described, the combination of a cannister having a discharge opening through the lower end thereof through which the contents thereof may feed by gravity, a substantially rectangular, one-piece slide-way arranged below the discharge opening of the cannister and having an opening through the top side thereof in registry therewith, a slide member having slidable engagement within said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, said one-piece slide-way being formed of sheet metal with its end edge portions flanged upwardly along the bottom thereof so as to form a rib, a gravity-opening closure hingedly mounted upon the rear of the lower end of the measuring container and adapted for slidable engagement with said upwardly extending rib so as to automatically close said closure as the slide member is moved back into filling position, said slide-way and said slide member having integrally formed co-operating means so constructed and arranged as to afford slidable engagement between the slide-way and the slide member and so as to afford also means for limiting the forward and rearward movements of said slide member.

5. In a device of the class described, the combination of a cannister having a discharge opening through the lower end thereof through which the contents thereof may feed by gravity, a substantially rectangular one-piece slide-way arrange below the discharge opening of the cannister and having an opening through the top side thereof in registry therewith, a slide member carried thereby and having slidable engagement within said slide-way, a measuring container carried by said slide member and having an open top for registry with the discharge opening of the cannister for filling the same, said slide member having a rearwardly extending imperforate portion adapted to close said discharge opening when the measuring container is in extended or discharging position, a closure upon the lower end of the measuring container, integral means provided upon the lower part of said slide-way for slidable engagement by said closure so as to permit said closure to automatically open and close upon manipulation of the measuring container into filling and discharging positions, an agitator within said cannister, and means whereby slidable movement of the measuring container will automatically operate said agitator.

6. In a device of the class described, the combination of a cannister having a discharge opening through the lower end thereof through which the contents thereof may feed by gravity, a substantially rectangular one-piece slide-way arranged below the discharge opening of the cannister and having an opening through the top side thereof in registry therewith, a slide member having slidable engagement within said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, a gravity-opening closure hinged upon the lower end of the measuring container, integral means provided upon the lower part of said slide-way for slidable engagement by said closure so as to permit said closure to automatically open and close upon manipulation of the measuring container into filling and discharging positions, an agitator within said cannister having a resilient control means extending through the discharge opening thereof and adapted to be engaged by the edge of the upper opening of the measuring container so as to actuate the agitator automatically upon manipulation of the slidable member.

7. In a device of the class described, the combination of a cannister having a discharge opening through the lower end thereof through which the contents thereof may feed by gravity, a slide-way arranged below the discharge opening of the cannister and having an opening through the top side thereof in registry therewith, a slide member having slidable engagement within said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, a closure upon the lower end of the measuring container, means provided upon the lower part of said slide-way for slidable engagement by said closure so as to permit said closure to automatically open and close upon manipulation of the measuring container into filling and discharging positions, an agitator within said cannister extending transversely thereof and having arms extending upwardly along the sides of the cannister, the upper ends of said arms being connected by a spring wire, means extending downwardly from said agitator and projecting sufficiently through the discharge opening of the cannister so as to project into the upper opening of the measuring container when in filling position and to be engaged by the edge of such opening as the slide member is moved outwardly into emptying position, said parts being so constructed and arranged that such slide movement of the slide member will automatically effect manipulation of the agitator vertically and laterally and the engagement of the slide member thereby will serve to maintain the same in either extended or withdrawn position.

8. In a device of the class described, the combination of a cannister having a discharge opening through the lower end thereof through which the contents thereof may feed by gravity, a slide-way arranged below the discharge opening of the cannister and having an opening through the top side thereof in registry therewith, a slide member having slidable engagement with said slide-way, a measuring container carried by said slide member and having an open top adapted for registry with the discharge opening of the cannister for filling the same, said slide member having a rearwardly extending imperforate portion adapted to close said discharge opening when the measuring container is in extended or discharging position, a gravity-opening hinged closure member upon the lower end of the measuring container, and an upwardly and longitudinally extending projection upon the bottom of the slide-way adapted for engagement by and across said closure so as to automatically close the same as the measuring container is moved to filling position and to securely hold the same in closed position.

GUSTAF R. HILLSTROM.